United States Patent
Watanabe et al.

(10) Patent No.: US 8,753,750 B2
(45) Date of Patent: Jun. 17, 2014

(54) REFLECTOR AND LIGHTING APPARATUS USING THE SAME

(75) Inventors: Kazuki Watanabe, Hirakata (JP); Shinjiro Noma, Neyagawa (JP); Satoru Yamauchi, Hirakata (JP); Shigeharu Fukuzawa, Nara (JP); Toshiharu Sako, Suita (JP)

(73) Assignee: Panasonic Electric Works Co., Ltd., Kadoma-shi (JP)

( * ) Notice: Subject to any disclaimer, the term of this patent is extended or adjusted under 35 U.S.C. 154(b) by 120 days.

(21) Appl. No.: 13/257,429

(22) PCT Filed: Mar. 19, 2010

(86) PCT No.: PCT/JP2010/054848
§ 371 (c)(1),
(2), (4) Date: Sep. 19, 2011

(87) PCT Pub. No.: WO2010/110218
PCT Pub. Date: Sep. 30, 2010

(65) Prior Publication Data
US 2012/0010353 A1 Jan. 12, 2012

(30) Foreign Application Priority Data
Mar. 25, 2009 (JP) .................................. 2009-074459

(51) Int. Cl.
*B32B 27/40* (2006.01)
*B32B 27/00* (2006.01)

(52) U.S. Cl.
USPC ........................................ 428/500; 428/423.1

(58) Field of Classification Search
None
See application file for complete search history.

(56) References Cited

U.S. PATENT DOCUMENTS 6,535,337 B1 * 3/2003 Tanaka et al. ................. 359/599

FOREIGN PATENT DOCUMENTS

| JP | 2000-230060 A | 8/2000 |
| JP | 2003-147202 A | 5/2003 |
| JP | 2004-035941 A | 2/2004 |
| JP | 2005-321623 A | 11/2005 |
| JP | 2006-163378 A | 6/2006 |
| JP | 2007-217561 A | 8/2007 |

OTHER PUBLICATIONS

Schmidt, D.L. et al: "Water-based non-stick hydrophobic coatings," Nature, vol. 368, Mar. 3, 1994, pp. 39-41, XP002685161.
European Search Report of EP 10756015.3 dated Oct. 25, 2012.
International Search Report dated Jun. 22, 2010, issued for PCT/JP2010/054848.

* cited by examiner

*Primary Examiner* — Sheeba Ahmed
(74) *Attorney, Agent, or Firm* — Edwards Wildman Palmer LLP; James E. Armstrong, IV; Jonathon P. Western

(57) ABSTRACT

A reflector of a lighting apparatus comprises a substrate and a coating layer located on a surface of the substrate. The coating layer is formed of a resin composition comprising an acrylic resin having at least one of a dimethylsiloxane group and a perfluoroalkyl group. Then, the coating layer is configured so that total surface free energy is less than or equal to 30 $[mJ/m^2]$, and when the total surface free energy is divided into two components of a polar force component and a dispersion force component, surface free energy of the dispersion force component is less than or equal to 25 $[mJ/m^2]$.

4 Claims, 2 Drawing Sheets

REFLECTOR AND LIGHTING APPARATUS USING THE SAME

TECHNICAL FIELD

The invention relates generally to reflectors and lighting apparatuses using the same and, more particularly, to a reflector comprising a coating layer for preventing adhesion of dirt and a lighting apparatus using the same.

BACKGROUND ART

Generally, there have been proposed various lighting apparatuses, and a lighting apparatus comprises a reflector to control a light distribution of a light source, such as a lamp. The reflector is located in a back side of the light source, and reflects light emitted from the light source forward. By the way, a surface of such a reflector is easy to be polluted by indoor-outdoor dirty air. Then, when dirt adheres to the surface of the reflector, the adhesion could cause a decrease in a reflectance of the reflector. In contrast, in the past, there have been proposed a reflector comprising a substrate and a coating layer located on a surface of the substrate.

For example, there have been considered a reflector which comprises a photocatalyst film as the coating layer located on the surface of the substrate. If the photocatalyst film is located as just described, a self-cleaning function can be given to the reflector. That is, if the lighting apparatus is installed in an outdoor location where the surface of the reflector gets wet with rainwater, dirt adhering to the surface of the reflector can be washed away and removed by rainwater. However, when the dirt exceeds the washing capability, the dirt can not be removed from the surface, and furthermore high surface free energy caused by photocatalytic hydrophilicity increases adherence power of the dirt, and rather removal of dirt becomes difficult. Also, the reflector of the lighting apparatus installed indoors rarely gets wet with rainwater directly, and thus the self-cleaning function is not developed and the dirt can not be removed.

On the other hand, the lighting apparatus is often installed in a high place beyond one's reach. Particularly, in late years there has been an increase in the number of the lighting apparatus comprising a long-life light source, and thus maintenance for the lighting apparatus has not been performed regularly. Hence, it is desired that the reflector can maintain a high reflectance for a long term.

Control of surface free energy of the reflector has been considered to solve these problems and demands. Adhesion of dirt is suppressed by controlling the surface free energy. Further, thereby the dirt uniformly adheres to the surface as dots, and can be prevented from spreading widely. As a result, control of the surface free energy can prevent a decrease in the reflectance of the reflector.

Here, an art to control the surface free energy low is disclosed in Japanese Patent Application Laid-Open No. 2000-230060 published on Aug. 22, 2000. A coating layer described in this document is formed of a composition including a macromolecule, which comprises a silicone obtained by copolymerizing a polymerizable silicone containing monomer and a radical polymerizable monomer as a part of combination chain. Also, the art to control the surface free energy low is disclosed in Japanese Patent Application Laid-Open No. 2003-147202 published on May 21, 2003. A coating layer described in this document is formed by sol-gel reaction of a silicon-containing compound and a fluorine-containing compound. Then, these coating layers can realize low surface free energy, and a slipping property of a water droplet can be enhanced.

However, the coating layer in the above No. 2000-230060 is formed of a material of which heat resistance is not so high, and thus there is a problem that the coating layer is not adequate to use for a lighting apparatus of which a light source produces heat. Then, the coating layer in the above No. 2003-147202 is a coating film which is coupled and formed by sol-gel reaction of a water-shedding silane coupling agent, and thus the coating layer has trouble with abrasion resistance and chemical resistance, and there is a problem that the coating layer is not adequate to use for a lighting apparatus.

DISCLOSURE OF THE INVENTION

It is an object of the present invention to provide a reflector and a lighting apparatus using the same, which can maintain a high reflectance and keep brightness for a long term.

A reflector of a lighting apparatus of the present invention comprises a substrate and a coating layer located on a surface of the substrate. According to a first aspect of the present invention, the coating layer is formed of a resin composition comprising an acrylic resin having at least one of a dimethylsiloxane group and a perfluoroalkyl group. Then, the coating layer is configured so that total surface free energy is less than or equal to 30 $[mJ/m^2]$, and further when the total surface free energy is divided into two components of a polar force component and a dispersion force component, surface free energy of the dispersion force component is less than or equal to 25 $[mJ/m^2]$. In the present invention, the coating layer is formed of an acrylic resin which comprises at least one of a dimethylsiloxane group and a perfluoroalkyl group as a part of combination chain. Therefore, dirt is hard to adhere to a surface of the reflector, and furthermore the reflector of the lighting apparatus has superior resistance to heat, light, abrasion and chemical, and can be provided. In addition, because the total surface free energy of the coating layer is less than or equal to 30 $[mJ/m^2]$ and the surface free energy of the dispersion force component is less than or equal to 25 $[mJ/m^2]$, the dirt uniformly adheres to the surface as dots, and can be prevented from spreading widely. As a result, the reflector and the lighting apparatus using the same can maintain a high reflectance and keep brightness for a long term.

In an embodiment, a surface of the coating layer is configured so that a difference between an advanced contact angle and a receded contact angle of a water droplet is less than or equal to 20 degrees. In this invention, because a difference between an advanced contact angle and a receded contact angle of a water droplet is less than or equal to 20 degrees, dirt adhering to the coating layer can be prevented from spreading widely more effectively and is fixed to the coating layer in a state of contraction. Thus, the reflector and the lighting apparatus using the same can maintain a high reflectance for a more long term.

In an embodiment, the acrylic resin has a hydroxyl group as a cross-linking part. The resin composition includes a cross-linker component having at least one of an amino resin and an isocyanate resin as a cross-linker of the acrylic resin having the hydroxyl group. In this invention, because the resin composition includes a cross-linker component having at least one of an amino resin and an isocyanate resin as a cross-linker of the acrylic resin having the hydroxyl group, the acrylic resin can be cross-linked and cured by a cross-linking reaction of the hydroxyl group of the acrylic resin and at least one of the amino resin and the isocyanate resin. Thus, the resistance to heat, chemical and abrasion of the coating layer can be improved more.

According to a second aspect of the present invention, a lighting apparatus comprises the above-mentioned reflector. In this invention, because the lighting apparatus comprises the above-mentioned reflector, the lighting apparatus can maintain a high reflectance and keep brightness for a long term, and can be provided.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Hereinafter, an embodiment of the present invention is explained with reference to FIGS. 1, 2A and 2B.

Figure 1:
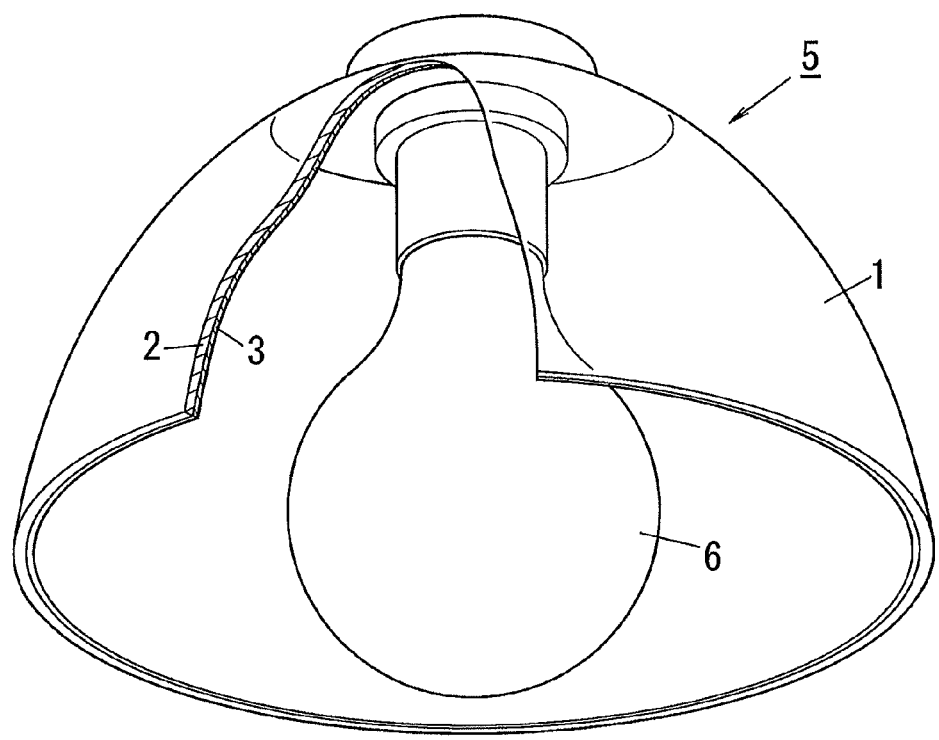
FIG. 1 is a schematic view including a cross-section view partially according to an embodiment of the present invention.

As long as a lighting apparatus 5 of the present invention, for example as shown in FIG. 1, comprises a light source 6 and a reflector 1 located in a back side of the light source 6, a configuration of the lighting apparatus 5 is not limited. However, if the lighting apparatus 5 is installed in a location where the reflector does not get wet with rainwater directly and thereby a self-cleaning function can not be expected very well, it is more effective. Specifically, such a location is indoor, an entrance and a space under the eaves in public accommodations, commercial facilities, factory, apartment and multiple dwelling houses. Then, a specific example of the lighting apparatus's form includes a base light, a ceiling light, a bracket, a spotlight, a down light, a tunnel light, etc.

The reflector 1 of the lighting apparatus 5 according to the present invention, as shown in FIG. 1, comprises a substrate 2 and a coating layer 3 located on a surface of the substrate 2. The substrate 2 can be formed of any materials comprising metal materials and resin materials and can be used. The coating layer 3 is formed of a resin composition. Then, the resin composition is explained below.

The resin composition of the coating layer 3 comprises an acrylic resin as a main component to form a matrix of the coating layer 3. The acrylic resin according to the present invention has a molecular structure comprising a dimethylsiloxane group and a perfluoroalkyl group as a side-chain in a molecular frame, and can be used. In addition, the molecular structure may comprise either the dimethylsiloxane group or the perfluoroalkyl group, or may comprise both these groups.

The dimethylsiloxane group is represented by the following constitutional formula and can be used.

[Chemical formula 1]

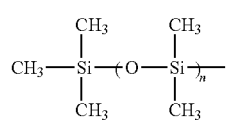

("n" is integers from 1 to 20)

Then, carbon number in the perfluoroalkyl group is preferably from 3 to 9, and is more preferably from 5 to 9, and is more preferably from 6 to 8. Such a perfluoroalkyl group includes, for example, a perfluoropropyl group, a perfluorobutyl group, a perfluoropentyl group, a perfluorohexyl group, a perfluoroheptyl group, a perfluorooctyl group, a perfluorononyl group, etc.

Such dimethylsiloxane group and perfluoroalkyl group are present in the molecular frame of the acrylic resin, and thereby dirt can be prevented from adhering to the coating layer 3 which is formed by adopting the acrylic resin as a matrix component. Additionally, by controlling the surface free energy, the dirt uniformly adheres as dots, and can be prevented from spreading widely. Therefore, the reflector 1 can maintain a high reflectance, and keep brightness of the lighting apparatus 5.

Here, it is preferable for a total of both the dimethylsiloxane group and the perfluoroalkyl group to be included in the acrylic resin (the side-chain is also included) in a range of 10-90 percent by mass. If there is too much content of the dimethylsiloxane group and the perfluoroalkyl group in the acrylic resin, the adhesion property of the coating layer 3 to the substrate 2 tends to decrease. On the contrary, if there is too little content of these groups, lowering of the surface free energy of the coating layer 3 can not be obtained effectively. The dimethylsiloxane group and the perfluoroalkyl group are directly coupled to the molecular frame in the acrylic resin, and thereby these groups do not fall off easily, and the coating layer 3 can maintain low surface free energy stably for a long term and can be provided.

As explained above, when the coating layer 3 is formed of the acrylic resin having the dimethylsiloxane group and the perfluoroalkyl group, the surface free energy can be controlled by the dimethylsiloxane group and the perfluoroalkyl group. Here, the surface free energy can be divided into two components of a polar force component and a dispersion force component. Then, in the present invention, when total surface free energy is a sum of surface free energy of the dispersion force component and surface free energy of the polar force component, the coating layer 3 is formed so that the total surface free energy is less than or equal to 30 [mJ/m$^2$] and the surface free energy of the dispersion force component is less than or equal to 25 [mJ/m$^2$].

That is, in the surface free energy, the dispersion force component "ysd" and the polar force component "ysp" can be calculated from a contact angle "θ" and a surface tension "yL" of water and methylene iodide by using the following equation. In addition, the following equation is a combination of Young equation and Owens equation obtained by expanding Fowkes equation.

$$(1+\cos\theta)*yL/2 = (ysd*yLd)^{1/2} + (ysp*yLp)^{1/2}$$

Then, as the dirt adhering to the lighting apparatus 5, there are dust, garbage and carbon refuse, etc. which include not only moisture but also oil. Thus, the adhesive and shedding properties of every dirt can be controlled by means of controlling not only total surface free energy intimately correlated with the adhesive and shedding properties of matter, but also the dispersion force component of the surface free energy which provides an indication of an oil shedding property. Then, as explained above, the total surface free energy of the coating layer 3 formed on the surface of the substrate 2 is less than or equal to 30 [mJ/m$^2$], and the surface free energy of the dispersion force component is less than or equal to 25 [mJ/m$^2$]. Herewith, a wetting property of the coating layer 3 is kept low, and thereby adhesion of dirt can be suppressed. In addition, even if the dirt adheres to the coating layer 3, the dirt uniformly adheres as dots and can be prevented from spreading widely. As a result, the reflector 1 can maintain a high reflectance and keep brightness for a long term. However, if the total surface free energy exceeds 30 [mJ/m$^2$] or the surface free energy of the dispersion force component exceeds 25 [mJ/m$^2$], the above-mentioned effect can not be obtained sufficiently. Such controls of total surface free energy of the coating layer 3 and surface free energy of the dispersion force component can be performed by adjusting content of the dimethylsiloxane group and the perfluoroalkyl group in the acrylic resin.

In addition, as long as the total surface free energy and the surface free energy of the dispersion force component meet the above-mentioned conditions, respectively, these are not limited and it is desirable to be smaller. However, a lower limit of the total surface free energy is 6.7 [mJ/m$^2$] which is a value when a —$CF_3$ group shows hexagonal closest packing. Also, a lower limit of the surface free energy of the dispersion force component is 6.7 [mJ/m$^2$]. It is proved that the surface free energy theoretically falls to 6.7 [mJ/m$^2$] as an ideal model. However, about 7.8 [mJ/m$^2$] is generally considered to be a limit value, which is worthy of practical use, for a coating film.

As explained above, the acrylic resin in the resin composition forming the coating layer 3 has at least one of a dimethylsiloxane group and a perfluoroalkyl group in the molecular structure, and additionally also may have a hydroxyl group as a cross-linker component. In this case, at least one of an amino resin and an isocyanate resin is included in the resin composition as a cure agent reacting with the hydroxyl group. Thereby, the acrylic resin can be cross-linked and cured, and then low surface free energy of the coating layer 3 can be maintained for a long term. Then, the coating layer 3 becomes a close layer by an increase in a crosslink density, and thus resistance to chemical and abrasion of the coating layer 3 can be improved. Then, either the amino resin or the isocyanate resin may be used, or both of these may be used together.

The content of the hydroxyl group in the acrylic resin is not limited in particular. However, it is preferred that the content is in a range of 10-200 [mgKOH/g], and more preferably the content is in a range of 50-150 [mg KOH/g]. If a hydroxyl group value is too low, the crosslink density of a provided coating film falls to a low level, and thus the coating layer 3 tends to have low hardness. In contrast, if the hydroxyl group value is too high, the coating layer 3 having high hardness is provided, but compatibility of the acrylic resin and a solvent tends to fall, and stability of the resin tends to be inferior.

Then, the isocyanate resin includes: aliphatic diisocyanates, such as lysine diisocyanate, hexamethylene diisocyanate and trimethylhexane diisocyanate; cyclic aliphatic diisocyanates, such as hydrogenation xylylene diisocyanate, isophorone diisocyanate, methylcyclohexane-2,4 (or 2,6)-diisocyanate, 4,4'-methylene bis(cyclohexyl isocyanate) and 1,3-(isocyanatomethyl)cyclohexane; aromatic diisocyanates, such as tolylene diisocyanate, xylylene diisocyanate and diphenyl methane diisocyanate; organic polyisocyanate itself, such as trivalent or higher polyisocyanate, as exemplified by lysine triisocyanate; adduct of the organic polyisocyanate with multiple alcohol, low-molecular-weight polyester resin, or water; cyclized polymer (for example, isocyanurate) obtained by cyclizing the above-mentioned organic diisocyanates together; or biuret type adduct. In addition, isocyanurate of the hexamethylene diisocyanate is more preferable in these. These can be used in only one kind or a mixture of two kinds or more.

The content of the isocyanate resin included in the resin composition is set so that a ratio (NCO/OH) of an isocyanate group (NCO) included in the isocyanate resin to a hydroxyl group (OH) included in the acrylic resin is within a range of 0.2 to 2.0. In addition, it's more preferred that the content is set so that the ratio is within a range of 0.5 to 1.5.

Then, melamine resin, benzoguanamine resin, glycoluril resin, or urea resin can be used for the amino resin. In addition, the melamine resin or the benzoguanamine resin is more preferable in these.

An alkyl-etherified thing is desirable for the melamine resin and the benzoguanamine resin. Other types, namely imino type or methylol type, are react readily with imino type melamine resin or methylol type melamine resin when trifunctional or tetrafunctional alkoxysilane is included in the resin composition as explained above, even if partial hydrolysis condensate of the alkoxysilane compound is treated with silane coupling agent. Then, the above-mentioned other types cause a decrease in paint storage stability, and thus are not preferable. The melamine resin substituted with at least one of methoxy group and butoxy group is particularly preferable in alkyl-etherified melamine resins. Then, the melamine resin has a hydrophobic property in addition to the paint storage stability. Thus, when a coating film of the coating layer 3 is formed, the melamine resin is eccentrically-located in a top layer of the coating film and thus the crosslink density in the top layer increases. In this way, contaminants can be prevented from penetrating into the inside of the coating layer 3, and then contamination resistance is improved. In addition, the melamine resin substituted with at least one of the methoxy group and the butoxy group is etherified with i-butyl group or n-butyl group alone, or with both butyl group and methyl group.

The content of the amino resin included in the resin composition is not limited. However, it is preferred that the content is set in a range of 10 to 50 percent by mass with respect to a solid of the acrylic resin, and more preferably the content is set in a range of 15 to 40 percent by mass. If the content of the amino resin is much, the coating layer 3 tends to become a hard but brittle film. In contrast, if the content of the amino resin is little, hardness for the coating layer 3 can not be obtained sufficiently by lack of degree of cross-linkage and then chemical resistance tends to become low. An application method of the resin composition is not limited, and then it is desirable to use, for example, a spray coating method, a dip coating method, a flow coating method, a spin coating method, a roll coating method, a brush coating method, or a sponge coating method. Then, a method of forming the coating layer 3 is not limited to only coating, and may be a method to laminate a shaped product of the resin composition formed into a sheet shape to the substrate 2. In addition, the method of forming the coating layer 3 may be a method to spray the resin composition into an inner surface of a mold and to laminate by forming the substrate 2 with the mold. Or the method of forming the coating layer 3 may be a method to impregnate a nonwoven cloth with the resin composition and to press it into shapes. A method of curing the resin composition is not limited, and can be selected voluntarily from a method of curing at ordinary temperatures (left out at room temperature) and a method of curing by printing, in accordance with cured coating performance required for the coating layer 3, upper temperature limit of the substrate 2, productivity, etc. Also, film thickness of the coating layer 3 is not limited, and should be usually around 0.1 to 50 [μm].

Figure 2A:
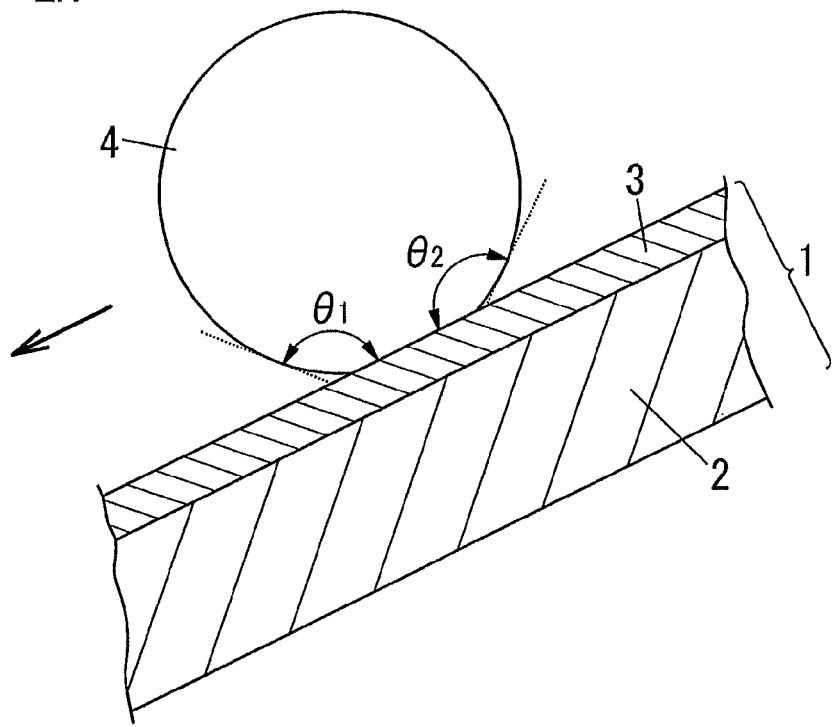
FIGS. 2A and 2B are explanation diagrams according to said embodiment of the present invention.
Figure 2B:
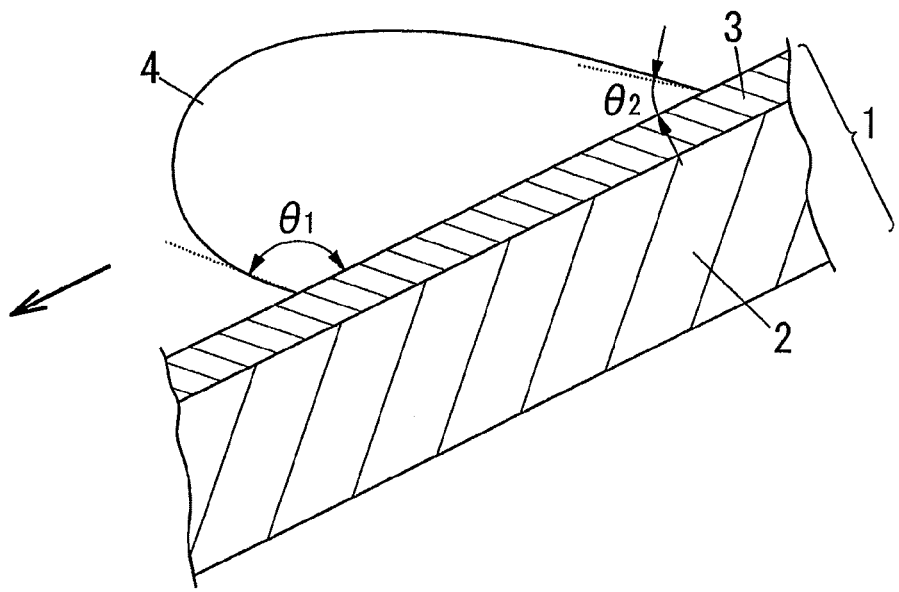

As explained above, in regard to properties of a dynamic contact angle in the surface of the coating layer 3, when the reflector 1 is formed, it is preferred that a difference between an advanced contact angle θ1 and a receded contact angle θ2 of a water droplet is less than or equal to 20 degrees, for example, as shown in FIG. 2A. When a water droplet 4 is dropped on the coating layer 3 placed horizontally and the coating layer 3 is slowly inclined and the water droplet 4 starts moving, the advanced contact angle θ1 means a contact angle in a lower part of the water droplet 4 and the receded contact angle θ2 means a contact angle in a upper part of the water droplet 4. Then, in such a dynamic contact angle, when the difference between the advanced and receded contact angles θ1, θ2 is small, the wetting property of the coating layer 3 decreases. Therefore, dirt adhering to the coating layer 3 can be prevented from spreading and is fixed to the coating layer 3 in a contracted state. In particular, even if a relatively-long time passes, the dirt can be prevented from spreading by fixing in the contracted state. Thus, the dirt can be prevented from spreading widely, and the reflector 1 can maintain a high reflectance and keep brightness of the lighting apparatus 5 for a long term. On the contrary, as shown in FIG. 2B, when the difference between the advanced and receded contact angles θ1, θ2 exceeds 20 degrees, the above effect can not be expected. In addition, it's preferred that the difference is smaller, and thus the lower limit is not set.

Then, Embodiments 1-8 having the feature of the present invention is specifically described below.

(Embodiment 1)

A coating liquid of a resin composition of the present embodiment was prepared by mixing 100 parts by mass of an acrylic resin having a dimethylsiloxane group and a hydroxyl group as a cross-linking group in a side-chain, 17.8 parts by mass of an isocyanate resin, 50 parts by mass of an ethyl acetate, 50 parts by mass of a butyl acetate, and 30 parts by mass of an isophorone, and by stirring the mixture for five minutes.

In addition, "ZX-022 (a solids content of 46 mass percent and a hydroxyl group value of 120 [mgKOH/g])" made in Fuji Kasei Kogyo Co., Ltd. was used for the above-mentioned acrylic resin. Then, "170HN (a solids content of 100 mass percent)" made in Mitsui Takeda Chemicals Inc. was used for the above-mentioned isocyanate resin.

A substrate used for a reflector of the present embodiment was painted white and was manufactured, as follows. At first, a polyester powder coating (made in Dai-Nippon Toryo Co., Ltd.) was applied to a surface of a SPCC (Steel Plate Cold Commercial) processing steel sheet by using an electrostatic gun. At this time, dried film thickness was adjusted to be 50 [μm]. Then, the applied steel sheet was heated at 160 degrees C. for 20 minutes, and thereby the substrate painted white was manufactured. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

(Embodiment 2)

A coating liquid of a resin composition of the present embodiment was prepared by mixing 100 parts by mass of an acrylic resin having a dimethylsiloxane group and a hydroxyl group as a cross-linking group in a side-chain, 25 parts by mass of a melamine resin, 50 parts by mass of an ethyl acetate, 50 parts by mass of a butyl acetate, and 20 parts by mass of a diacetonealcohol, and by stirring the mixture for five minutes.

In addition, like the Embodiment 1, "ZX-022" made in Fuji Kasei Kogyo Co., Ltd. was used for the above-mentioned acrylic resin. Then, "U-van122 (a solids content of 60 mass percent)" made in Mitsui Chemicals Co., Ltd. was used for the above-mentioned melamine resin.

A substrate used for a reflector of the present embodiment was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 160 degrees C. for 30 minutes to be cured, and thereby a coating board was obtained, and a coating layer was formed on the surface of the substrate.

(Embodiment 3)

A coating liquid of a resin composition of the present embodiment was prepared by mixing 50 parts by mass of an acrylic resin having a dimethylsiloxane group and a hydroxyl group as a cross-linking group, in a side-chain, 100 parts by mass of an acrylic resin not having a dimethyl-siloxane group in a side-chain, 13.85 parts by mass of an isocyanate resin, 50 parts by mass of an ethyl acetate, 50 parts by mass of a butyl acetate, and 30 parts by mass of an isophorone, and by stirring the mixture for five minutes.

In addition, like the Embodiment 1, "ZX-022" made in Fuji Kasei Kogyo Co., Ltd. was used for the above-mentioned acrylic resin having the dimethylsiloxane group and the hydroxyl group. Then, "A-817 (a solids content of 50 mass percent and a hydroxyl group value of 60 [mgKOH/g])" made in Dainippon Ink & Chemicals Inc. was used for the above-mentioned acrylic resin not having the dimethylsiloxane group. Then, "170HN" made in Mitsui Takeda Chemicals Inc. was used for the above-mentioned isocyanate resin, like the Embodiment 1.

A substrate used for a reflector of the present embodiment was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

(Embodiment 4)

A coating liquid of a resin composition of the present embodiment was prepared by mixing 50 parts by mass of an acrylic resin having a dimethylsiloxane group and a hydroxyl group as a cross-linking group in a side-chain, 100 parts by mass of an acrylic resin not having a dimethyl-siloxane group in a side-chain, 25 parts by mass of a melamine resin, 50 parts by mass of an ethyl acetate, 50 parts by mass of a butyl acetate, and 30 parts by mass of a diacetonealcohol, and by stirring the mixture for five minutes.

In addition, "ZX-022" made in Fuji Kasei Kogyo Co., Ltd. was used for the above-mentioned acrylic resin having the dimethylsiloxane group and the hydroxyl group, like the Embodiment 1. Then, "A-817" made in Dainippon Ink & Chemicals Inc. was used for the above-mentioned acrylic resin not having the dimethylsiloxane group, like the Embodiment 3. Then, "U-van122" made in Mitsui Chemicals Co., Ltd. was used for the above-mentioned melamine resin, like the Embodiment 2.

A substrate used for a reflector of the present embodiment was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 160 degrees C. for 30 minutes to be cured, and thereby a coating board was obtained, and a coating layer was formed on the surface of the substrate.

(Embodiment 5)

A coating liquid of a resin composition of the present embodiment was prepared by mixing 100 parts by mass of an acrylic resin having a perfluoroalkyl group (a perfluorooctyl group) and a hydroxyl group as a cross-linking group in a side-chain, 6.0 parts by mass of an isocyanate resin, 50 parts by mass of an ethyl acetate, 50 parts by mass of a butyl acetate, and 30 parts by mass of an isophorone, and by stirring the mixture for five minutes.

In addition, "KD-220 (a solids content of 30 mass percent and a hydroxyl group value of 60 [mgKOH/g])" made in Kanto Denka Kogyo Co., Ltd. was used for the above-mentioned acrylic resin. Then, "170HN" made in Mitsui Takeda Chemicals Inc. was used for the above-mentioned isocyanate resin, like the Embodiment 1.

A substrate used for a reflector of the present embodiment was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

(Embodiment 6)

A coating liquid of a resin composition of the present embodiment was prepared by mixing 100 parts by mass of an acrylic resin having a perfluoroalkyl group and a hydroxyl group as a cross-linking group in a side-chain, 16 parts by mass of a melamine resin, 50 parts by mass of an ethyl acetate, 50 parts by mass of a butyl acetate, and 30 parts by mass of diacetonealcohol, and by stirring the mixture for five minutes.

In addition, "KD-220" made in Kanto Denka Kogyo Co., Ltd. was used for the above acrylic resin, like the Embodiment 5. Then, "U-van122" made in Mitsui Chemicals Co., Ltd. was used for the above-mentioned melamine resin, like the Embodiment 2.

A substrate used for a reflector of the present embodiment was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

(Embodiment 7)

A coating liquid of a resin composition of the present embodiment was prepared by mixing 50 parts by mass of an acrylic resin having a perfluoroalkyl group and a hydroxyl group as a cross-linking group in a side-chain, 100 parts by mass of an acrylic resin not having a perfluoroalkyl group in a side-chain, 7.9 parts by mass of an isocyanate resin, 50 parts by mass of an ethyl acetate, 50 parts by mass of a butyl acetate, and 30 parts by mass of an isophorone, and by stirring the mixture for five minutes.

In addition, "KD-220" made in Kanto Denka Kogyo Co., Ltd. was used for the above-mentioned acrylic resin having the perfluoroalkyl group and the hydroxyl group, like the Embodiment 5. Then, "A-817" made in Dainippon Ink & Chemicals Inc. was used for the above-mentioned acrylic resin not having the perfluoroalkyl group, like the Embodiment 3. Then, "170HN" made in Mitsui Takeda Chemicals Inc. was used for the above-mentioned isocyanate resin, like the Embodiment 1.

A substrate used for a reflector of the present embodiment was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

(Embodiment 8)

A coating liquid of a resin composition of the present embodiment was prepared by mixing 100 parts by mass of an acrylic resin having a perfluoroalkyl group and a hydroxyl group as a cross-linking group in a side-chain, 100 parts by mass of an acrylic resin not having a perfluoroalkyl group in a side-chain, 22.2 parts by mass of a melamine resin, 50 parts by mass of an ethyl acetate, 50 parts by mass of a butyl acetate, and 30 parts by mass of diacetonealcohol, and by stirring the mixture for five minutes.

In addition, "KD-220" made in Kanto Denka Kogyo Co., Ltd. was used for the above-mentioned acrylic resin having the perfluoroalkyl group and the hydroxyl group, like the Embodiment 5. Then, "A-817" made in Dainippon Ink & Chemicals Inc. was used for the above-mentioned acrylic resin not having the perfluoroalkyl group, like the Embodiment 3. Then, "U-van122" made in Mitsui Chemicals Co., Ltd. was used for the above-mentioned melamine resin, like the Embodiment 2.

A substrate used for a reflector of the present embodiment was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

Then, comparison examples 1-6 not having the feature of the present invention were prepared to be compared with the above Embodiments 1-8, and are specifically described below.

COMPARISON EXAMPLE 1

A coating liquid of a resin composition of the present comparison example was prepared by mixing 100 parts by mass of an acrylic resin not having a dimethylsiloxane group and a perfluoroalkyl group, 9.9 parts by mass of an isocyanate, 50 parts by mass of an ethyl acetate, 50 parts by mass of a butyl acetate, and 30 parts by mass of an isophorone, and by stirring the mixture for five minutes.

In addition, "A-817" made in Dainippon Ink & Chemicals Inc. was used for the above-mentioned acrylic resin, like the Embodiment 3. Then, "170HN" made in Mitsui Takeda Chemicals Inc. was used for the above-mentioned isocyanate resin, like the Embodiment 1.

A substrate used for a reflector of the present comparison example was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

COMPARISON EXAMPLE 2

A coating liquid of a resin composition of the present comparison example was prepared by mixing 100 parts by mass of an acrylic resin not having a dimethylsiloxane group and a perfluoroalkyl group, 27.8 parts by mass of a melamine resin, 50 parts by mass of an ethyl acetate, 50 parts by mass of a butyl acetate, and 30 parts by mass of a diacetonealcohol, and by stirring the mixture for five minutes.

In addition, "A-817" made in Dainippon Ink & Chemicals Inc. was used for the above-mentioned acrylic resin, like the Embodiment 3. Then, "U-van 122" made in Mitsui Chemicals Co., Ltd. was used for the above-mentioned melamine resin, like the Embodiment 2.

A substrate used for a reflector of the present comparison example was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

COMPARISON EXAMPLE 3

A coating liquid of a resin composition of the present comparison example was prepared by mixing 100 parts by mass of a fluorine resin not having a side-chain, 23.7 parts by mass of an isocyanate, 50 parts by mass of an ethyl acetate, 50 parts by mass of a butyl acetate, and 30 parts by mass of an isophorone, and by stirring the mixture for five minutes.

In addition, "K703 (a solids content of 60 mass percent and a hydroxyl group value of 72 [mgKOH/g])" made in Dainippon Ink & Chemicals Inc. was used for the above-mentioned fluorine resin. Then, "170HN" made in Mitsui Takeda Chemicals Inc. was used for the above-mentioned isocyanate resin, like the Embodiment 1.

A substrate used for a reflector of the present comparison example was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

COMPARISON EXAMPLE 4

A coating liquid of a resin composition of the present comparison example was prepared by mixing 100 parts by mass of a fluorine resin not having a side-chain, 33.3 parts by mass of a melamine resin, 50 parts by mass of an ethyl acetate, 50 parts by mass of a butyl acetate, and 30 parts by mass of a diacetonealcohol, and by stirring the mixture for five minutes.

In addition, "K703" made in Dainippon Ink & Chemicals Inc. was used for the above-mentioned fluorine resin, like the Comparison example 3. Then, "U-van 122" made in Mitsui Chemicals Co., Ltd. was used for the above-mentioned melamine resin, like the Embodiment 2.

A substrate used for a reflector of the present comparison example was painted white and was manufactured, like the Embodiment 1. Then, a surface of a white coating film of the substrate was painted with the above-mentioned coating liquid by using an air spray. At this time, dried film thickness was adjusted to be 5 [μm]. Then, the substrate painted with the coating liquid was heated at 120 degrees C. for 30 minutes to be cured, and thereby a coating board was obtained, and a coating layer was formed on the surface of the substrate.

COMPARISON EXAMPLE 5

A substrate used for a reflector of the present comparison example was painted white and was manufactured, like the Embodiment 1. Then, a surface of a white coating film was painted with a monomolecular film ("DS-5110Z130" made in HARVES Co., Ltd.: NV 0.1 mass percent) having a perfluoroalkyl group by using an air spray. At this time, dried film thickness was adjusted to be 0.1 [μm]. Then, the substrate painted with the monomolecular film was heated at 120 degrees C. for 30 minutes, and thereby a coating board was obtained, and a coating layer was formed on the surface of the substrate.

COMPARISON EXAMPLE 6

The substrate provided with the white coating film of the Embodiment 1 was directly used as a test board of the present comparison example.

Evaluations of the following items (1) to (7) were performed with respect to the coating boards manufactured in the above Embodiments 1-8 and the Comparison examples 1-5 and the test board of the Comparison example 6.

(1) Surface Free Energy

When water and diiodomethane were fallen in drops on the coating layers of the coating boards and the coating surface of the test board, these contact angles were measured by using a contact angle meter ("DM500" made in Kyowa Interface Science Co., Ltd.). Then, each of these contact angles was substituted into the following formula, and thus a dispersion force component (ysd) and a polar force component (ysp) of surface free energy were calculated, and total surface free energy and surface free energy of the dispersion force component were obtained.

$$(1+\cos\theta)*yL/2=(ysd*yLd)^{1/2}+(ysp*yLp)^{1/2}$$

(2) Difference Between Advanced and Receded Contact Angles

A dynamic advanced contact angle and a dynamic receded contact angle of a water droplet were measured by an expansion/contraction method by using the contact angle meter made in Kyowa Interface Science Co., Ltd. Then, the difference between the advanced and receded contact angles was obtained from these measured values.

(3) Change of Contact Angles

A contact angle of a water droplet in an initial state and a contact angle of the water droplet in a state where five minutes had passed since the initial state were measured by using the contact angle meter made in Kyowa Interface Science Co., Ltd., and thereby change of these contact angles was calculated.

(4) Initial Reflectance

Total luminous reflectance was measured by an integrating sphere measurement, by using a spectral photometer "U-4100" made in Hitachi High-Technologies Co., Ltd. Then, the total luminous reflectance measured before adhesion of the dirty liquid was set as an initial reflectance. If the initial reflectance is more than or equal to 80%, it can be judged to be good.

(5) Reflectance after Adhesion of Dirty Liquid

Evaluations of reflectances of the coating boards and the test board were performed upon adhesion of the dirty liquid. In this case, the dirty liquid was a suspension comprising carbon black, water and oil. Specifically, the carbon black was used on the assumption that exhaust gas adhered, and the dirty liquid was prepared by mixing the carbon black, the water and the oil. "FW2 (average particle diameter 13 [μm], specific surface 460 [g/m$^2$])" of 3 [g] made in Degussa Co., Ltd. was used for the carbon black. Then, pure water of 250 [g] was used for the water, and soluble cutting oil ("Emulcut B-50" made in Kyodo Yushi Co., Ltd.) of 47 [g] was used for the oil. Then, these were mixed and were uniformly dispersed, and thereby the suspension having a total mass of 300 [g] was used for the dirty liquid. The dirty liquid was sprayed onto the surfaces of the coating layers of the coating boards and the test board with a mister, and thereby these surfaces uniformly got wet with the dirty liquid. Then, after adhesion of the dirty liquid, the coating boards and the test board were kept at 90 degrees C. for about 15 minutes. In this way, the water was evaporated from these surfaces, and the coating boards and the test board were dried. After this, like the item (4), the total luminous reflectance was measured. If the reflectance was more than or equal to 80%, a circle (○) was put as the evaluation of the reflectance. Then, if the reflectance was less than 80%, a cross (X) was put as the evaluation of the reflectance.

surfaces were cleaned. After this, like the item (4), the total luminous reflectance was measured. If the reflectance was more than or equal to 90%, a circle (○) was put as the evaluation of the reflectance. Then, if the reflectance was more than or equal to 80% and less than 90%, a triangle (Δ) was put as the evaluation of the reflectance. Then, if the reflectance was less than 80%, a cross (X) was put as the evaluation of the reflectance.

(7) Adhesion Properties

Adhesion properties of the coating layers were examined by using the adhesion test described in JIS K-5600 (Japanese Industrial Standards). Then, the adhesion properties were evaluated by using the following criteria for determining.
There is no detachment area: ○
Detachment area is 10-50%: Δ
Detachment area is more than 50%: X

TABLE 1

| | RESIN COMPOSITION OF COATING LAYER | CROSS-LINKER | TOTAL SURFACE FREE ENERGY (mJ/m$^2$) | DISPERSION FORCE COMPONENT (mJ/m$^2$) | ADVANCED CONTACT ANGLE-RECEDED CONTACT ANGLE (°) |
|---|---|---|---|---|---|
| EMBODIMENT 1 | ACRYLIC RESIN HAVING SIDE-CHAIN (SIDE-CHAIN SILICONE) | ISOCYANATE | 28 | 23 | 3 |
| EMBODIMENT 2 | ACRYLIC RESIN HAVING SIDE-CHAIN (SIDE-CHAIN SILICONE) | MELAMINE | 28 | 22 | 4 |
| EMBODIMENT 3 | ADDITION OF ACRYLIC RESIN NOT HAVING SIDE-CHAIN TO EMBODIMENT 1 | ISOCYANATE | 29 | 23 | 5 |
| EMBODIMENT 4 | ADDITION OF ACRYLIC RESIN NOT HAVING SIDE-CHAIN TO EMBODIMENT 2 | MELAMINE | 27 | 22 | 6 |
| EMBODIMENT 5 | ACRYLIC RESIN HAVING SIDE-CHAIN (SIDE-CHAIN FLUORINE) | ISOCYANATE | 19 | 14 | 12 |
| EMBODIMENT 6 | ACRYLIC RESIN HAVING SIDE-CHAIN (SIDE-CHAIN FLUORINE) | MELAMINE | 18 | 13 | 13 |
| EMBODIMENT 7 | ADDITION OF ACRYLIC RESIN NOT HAVING SIDE-CHAIN TO EMBODIMENT 5 | ISOCYANATE | 19 | 15 | 14 |
| EMBODIMENT 8 | ADDITION OF ACRYLIC RESIN NOT HAVING SIDE-CHAIN TO EMBODIMENT 6 | MELAMINE | 18 | 15 | 15 |
| COMPARISON 1 | ACRYLIC RESIN NOT HAVING SIDE-CHAIN | ISOCYANATE | 46 | 40 | 23 |
| COMPARISON 2 | ACRYLIC RESIN NOT HAVING SIDE-CHAIN | MELAMINE | 45 | 41 | 21 |
| COMPARISON 3 | FLUORINE RESIN NOT HAVING SIDE-CHAIN | ISOCYANATE | 40 | 34 | 22 |
| COMPARISON 4 | FLUORINE RESIN NOT HAVING SIDE-CHAIN | MELAMINE | 41 | 33 | 21 |
| COMPARISON 5 | MONOMOLECULAR FILM | — | 19 | 14 | 14 |
| COMPARISON 6 | NOTHING | NOTHING | 45 | 42 | 22 |

| | CONTACT ANGLE OF WATER IN INITIAL (°) | CONTACT ANGLE OF WATER AFTER 5 min (°) | INITIAL REFLECTANCE (%) | REFLECTANCE AFTER ADHESION OF DIRTY LIQUID (%) | REFLECTANCE AFTER REMOVAL OF DIRTY LIQUID (%) | ADHESION PROPERTY |
|---|---|---|---|---|---|---|
| EMBODIMENT 1 | 105 | 102 | 93.6 | ○ (83) | ○ (91.5) | ○ |
| EMBODIMENT 2 | 106 | 101 | 94.0 | ○ (82.5) | ○ (92) | ○ |
| EMBODIMENT 3 | 106 | 101 | 93.2 | ○ (81.5) | ○ (92.2) | ○ |
| EMBODIMENT 4 | 105 | 102 | 93.4 | ○ (81.6) | ○ (92.1) | ○ |
| EMBODIMENT 5 | 116 | 103 | 92.9 | ○ (80.5) | ○ (91.5) | ○ |
| EMBODIMENT 6 | 117 | 104 | 92.8 | ○ (80.6) | ○ (91.4) | ○ |
| EMBODIMENT 7 | 115 | 101 | 92.5 | ○ (80.1) | ○ (91.2) | ○ |
| EMBODIMENT 8 | 114 | 100 | 92.6 | ○ (80.2) | ○ (91.5) | ○ |
| COMPARISON 1 | 87 | 62 | 92.3 | X (55.0) | X (72) | ○ |
| COMPARISON 2 | 85 | 63 | 92.5 | X (56.1) | X (73.2) | ○ |
| COMPARISON 3 | 93 | 71 | 92.8 | X (72.1) | Δ (85) | ○ |
| COMPARISON 4 | 92 | 70 | 92.6 | X (71.3) | Δ (83) | ○ |
| COMPARISON 5 | 113 | 101 | 92.1 | ○ (80.3) | Δ (83.5) | X |
| COMPARISON 6 | 84 | 60 | 92.3 | X (45.5) | X (50.2) | — |

(6) Reflectance after Removal of Dirty Liquid

After the dirty liquid of the item (5) was sprayed onto the surfaces of the coating layers of the coating boards and the test board and thereby dirt adhered, a cloth was shuttled 10 times while load of 500 [g] was applied to the cloth. In this way, the dirty liquid was removed from the surfaces, and the As shown in the Table 1, in regard to change of the contact angles, it's found that each of the Embodiments 1-8 having the feature of the present invention is smaller compared with the Comparison examples 1-6 not having the feature of the present invention. Also, in regard to the reflectance after adhesion of the dirty liquid, it's found that decrease of each of the Embodiments 1-8 is less compared with the Comparison examples 1-6. In addition, in regard to the reflectance after removal of the dirty liquid, it's found that each of the Embodiments 1-8 is higher compared with the Comparison examples 1-6. That is, the reflector 1 comprises the substrate 2 and coating layer 3 formed as described in the Embodiments 1-8, and then the reflector 1 and the lighting apparatus 5 using the same can maintain a high reflectance and keep brightness for a long term.

Although the present invention has been described with reference to certain preferred embodiments, numerous modifications and variations can be made by those skilled in the art without departing from the true spirit and scope of this invention, namely claims.

The invention claimed is:

1. A reflector of a lighting apparatus comprising:
   a substrate; and
   a coating layer located on a surface of the substrate,
   wherein the coating layer is formed of a resin composition comprising an acrylic resin having at least one of a dimethylsiloxane group and a perfluoroalkyl group as a side-chain in a molecular frame,
   wherein the acrylic resin has a hydroxyl group as a cross-linking part,
   wherein the resin composition includes a cross-linker component having at least one of an amino resin and an isocyanate resin as a cross-linker of the acrylic resin having the hydroxyl group, and
   wherein the coating layer is configured so that total surface free energy is less than or equal to 30 $[mJ/m^2]$, and when the total surface free energy is divided into two components of a polar force component and a dispersion force component, surface free energy of the dispersion force component is less than or equal to 25 $[mJ/m^2]$.

2. The reflector as claimed in claim 1, wherein a surface of the coating layer is configured so that a difference between an advanced contact angle and a receded contact angle of a water droplet is less than or equal to 20 degrees.

3. A lighting apparatus comprising the reflector as claimed in claim 1.

4. A lighting apparatus comprising the reflector as claimed in claim 2.

* * * * *